United States Patent
Liautaud

[15] 3,673,610
[45] July 4, 1972

[54] RESILIENT HEADBAND FOR SPECTACLES
[72] Inventor: Philip J. Liautaud, Hoffman Estates, Ill.
[73] Assignee: Fendall Company, Chicago, Ill.
[22] Filed: April 5, 1971
[21] Appl. No.: 131,268

Related U.S. Application Data
[62] Division of Ser. No. 776,546, Nov. 18, 1968, Pat. No. 3,582,194.

[52] U.S. Cl. ............................................................2/14 V
[51] Int. Cl. ........................................................G02c 3/00
[58] Field of Search ........................................351/155–157; 2/14 V, 14 A, 14 R, 323, 338; 24/3 C

[56] References Cited
UNITED STATES PATENTS
2,545,428   3/1951   Liautaud...................................2/14 V
3,588,960   6/1971   McClellan et al........................24/3 C Primary Examiner—David Schonberg
Assistant Examiner—John W. Leonard
Attorney—Hill, Sherman, Meroni, Gross & Simpson

[57] ABSTRACT

A resilient headband for spectacles providing light tension for retaining the spectacles on the wearer's head, comprising a length of rubberlike material having its ends of a larger diameter than the intermediate portion and arranged for securement to the spectacles whereby stretch forces applied to the headband during use result mainly in elongation of the intermediate portion.

6 Claims, 6 Drawing Figures

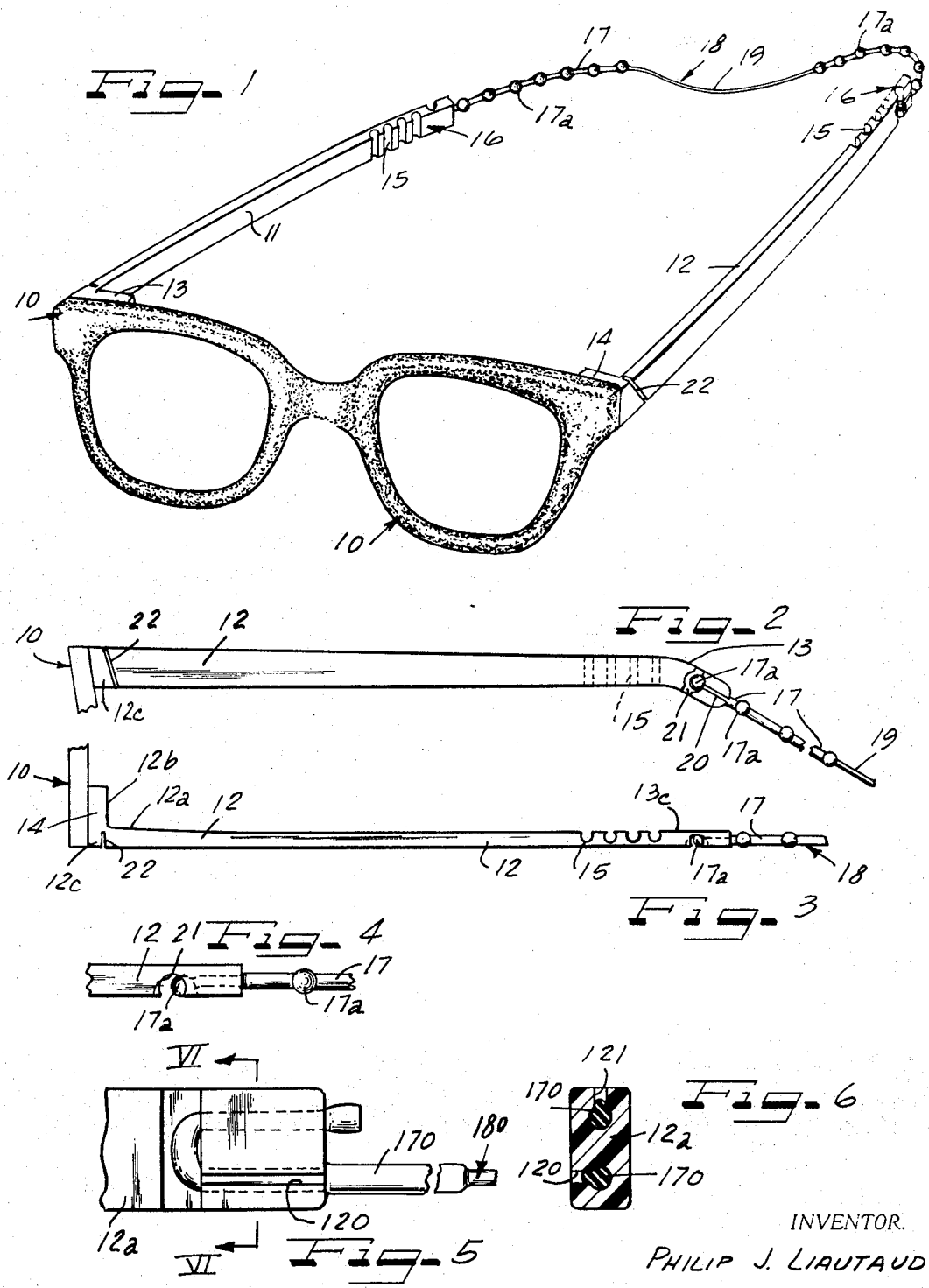

RESILIENT HEADBAND FOR SPECTACLES

The present application is a division of U.S. Ser. No. 776,546, filed Nov. 18, 1968 entitled "Head Conforming Spectacles," now U.S. Pat. No. 3,582,194.

BACKGROUND OF THE INVENTION

Safety goggles and safety spectacles have ordinarily been somewhat heavier than conventional eyeglasses. Those persons required to wear safety glasses, as well as those who do without such a requirement, are continuously searching for a means for successfully rendering the spectacles lighter and more comfortably secure when in position on the user. Flexible temples of the yieldable metal type have long been well known in the spectacle art. A springiness is provided in such prior temples to assure that the outermost ends, away from the spectacle frame, are provided with a biasing force tending to force the outermost ends of the temples tightly against the wear's head. However, many persons, particularly those not accustomed to wearing eyeglasses find the pressure of such temples uncomfortable. Further, due to the relatively heavy nature of safety spectacles, it is difficult to achieve sufficient spring pressure against the wear's head to prevent the spectacles from falling off the wearer during periods in which the wearer is facing downwardly. For example, electricians and many other workmen spend a considerable percentage of their working day facing in a downward direction. In the past, such workmen have been forced to employ safety goggles of the type ordinarily employing relatively strong rubber type bands for holding the goggles in place. For example, such a goggle arrangement is shown in U.S. Pat. No. 2,545,428. However, such constructions, while effective to maintain the safety goggle in place, are also relatively uncomfortable over long periods of time and are a source of constant annoyance to many users.

In order to provide positive means for maintaining a very comfortable safety spectacle on the wearer, while at the same time absolutely preventing its accidental removal from the wearer's head, a novel, flexible temple is provided in accordance with the present invention is accomplished by way of a thin rubberband adjustably secured to the ends of the temples of the spectacle in a manner permitting ready tension adjustment to suit individual wearer dimensions. The extreme stiffness ordinarily accompanying spectacle temples is eliminated in accordance with the present invention and, in fact, utilization of the structure of the present invention readily permits elimination of metal from the spectacle frame and temple combination. This elimination provides a further reduction in danger to electricians, and the like, who are in constant danger of electrical shock when wearing spectacles having conductive frame or temple members.

In solution of the above problems, the present invention contemplates the utilization of relatively stiff plastic temple members having a plurality of notches at the extremities thereof providing substantial flexibility at those extremities. Preferably, vertical grooves are provided at the extremities at the inside surfaces of the temples facing toward the wearer's head, so that the grooves serve the dual function of providing flexibility of the temple and also providing a friction detent for co-operative contact with the wearer. A very thin, highly resilient rubber headband is provided and the flexible extremities of the temples are provided with a simple adjustment whereby the length of the resilient headband may be modified to cause it so snugly position the temples against the wearer's head. In a preferred embodiment of the invention, the temples extend beyond the point of maximum transverse dimension of the wearer'head so that the resiliently biased inturning extremities of the temple provide a substantially positive positioning of the spectacles on the wearer's head. It has been found that by providing a very small, highly yieldable or resilient headband, substantially no pressure is applied to the wearer but at the same time the spectacles are maintained in a positive way on the wearer.

It is an object of the invention to provide a snug-fitting, comfortable spectacle requiring substantially no metallic components and at the same time providing substantially universal fit characteristics.

It is a further object of the invention to provide a substantially nonconducting spectacle capable of comfortable use by electricians, and others continually faced with visual inspection of objects positioned substantially below eye level.

Still another object of the invention is to provide a simple retaining means for preventing accidental dislodgement of the spectacles while being worn.

Still other and further objects of the invention will be apparent from a consideration of the drawings and accompanying detailed description.

DESCRIPTION OF THE DRAWINGS

FIG. 1 is an isometric view of a pair of spectacles incorporating an embodiment of the present invention;

FIG. 2 is a side-elevational view of one temple constructed in accordance with the present invention and viewed from the right-hand side of FIG. 1;

FIG. 3 is a plan view of the temple shown in FIG. 2 and further illustrating details of construction of the spectacle frame;

FIG. 4 is a plan view of a further embodiment of the present invention;

FIG. 5 is a side-elevational view of the securing means illustrated in FIG. 4; and FIG. 6 is a cross-sectional view taken along the line VI—VI of FIG. 5.

DETAILED DESCRIPTION

As may be seen from a consideration of the drawings, a spectacle frame 10 is provided with a pair of temples 11 and 12. The temples are secured by respective hinges 13,14 to the frame 10 and each is provided at its outer end with a plurality of vertically extending or transverse slots 15. The outermost ends of the temples 11 and 12 are provided with attachment means generally at 16 for co-operative attachment of the ends of a resilient headband generally indicated at 18.

The headband 18 may take several forms and may be constructed of various materials. In a preferred embodiment of the invention, however, the band may comprise approximately an 8-inch band with an approximately 3-inch central section indicated at 19 which central section is of a reduced cross-sectional area. At opposite ends of the reduced section 19 are enlarged diameter cross-section portions 17 which have, in addition to their larger diameter, a series of molded ball detent portions 17a. In my preferred embodiment of the invention, I utilize a resilient material having the general yieldability of rubber. For example, a moldable natural rubber compound of a 50 Durometer has proven eminently satisfactory in this use. Since it is desired that the material be uniformly formulated over its entire length, a given tension applied along the ends of the band will initially cause a substantial deformation or elongation of the central portion 19. By providing enlarged diameter ends, manipulation of the ends by stretching them to restrain them in various forms of attachment devices, located at the outermost ends of the temples, places the attachment under a relatively large retaining pressure. This retaining pressure is not reached under ordinary usage conditions since stretching of the relatively thin portion 19 of the band provides a very large amount of stretch before the tension required for the stretch will provide sufficient deformation of the larger diameter portions to cause slippage of the retention devices. It has been found that a relatively uniformly stretchable material such as the molded natural rubber compound mentioned above is eminently satisfactory when employed in a strip approximating 8 inches over-all with a 3-inch reduced diameter center portion of 0.050 inches diameter compared to a 0.060 inches outer end diameter.

A preferred embodiment of the means for attaching the resilient head band to the outermost ends of the temples may readily be seen from a consideration of FIGS. 2 and 3. The outermost end of the temple 12 is, as there shown, provided with a generally longitudinally extending slot 20 having a T head portion 21. The width of the slot 20 is less than the portion 17 of the band 18 so that it is required that the portion 17 be stretched sufficiently to reduce the diameter thereof to a width approximating the width of the slot 20. In such stretched condition, the portion 17 is pressed into the slot and is retained in position by its residual expansion, and by the fact that the ball 17a, being of still larger cross-sectional diameter than the portion 17, resists being pulled through the slot 20 when longitudinal forces are applied to the band. It will be apparent that different wearers will have different head circumferences and, accordingly, it will be found that variations in length of the resilient band will occur between differing wearers. With the utilization of the embodiment of the invention illustrated in FIGS. 1, 2 and 3, the adjustment may readily be made by attaching the resilient band to the temple in the manner above discussed and then, after an adjustment and trail are accomplished, cutting off the excess length of rubber headband immediately adjacent the ball portion 17a. This permits elimination of any projecting ends of the resilient head bands and provides a final adjustment for any given wearer, since once an adjustment has been made, there will be substantially no case in which a longer headband will become necessary.

As a result of the above construction, the temples 11 and 12 are resiliently biased rearwardly of the wearer's head by the resiliency of the band 18 and, at the same time, the resiliency provides a transverse force tending to bend the outermost ends of the temple, beyond the ear, toward the head of the wearer. The downturned ends 13c of the temple portions extending behind the wearer's ears also provide close conformity to the head and give improved alignment of the head band. The provision of relieved notch portions 15, particularly when coupled with a temple material of a yieldable sort, such as for example polypropylene, polyethylene, and other similar plastics having a flexible characteristic in thin section, permits the ends of the temples to move inwardly to grasp the wearer's head. Provision of the vertical notches or slots 15 provides not only for this flexibility in the temple but also provides an improved frictional contact between the temple and the wearer. The result of the combination friction contact the resilient support by the band 18, provides a spectacle having a very light feel on the wearer's head and at the same time having substantially completely positive retention on the head of the wearer.

As mentioned above, it is desired that the spectacle of the present invention be substantially completely dielectric. Utilization of the resilient, rubber headband provides an attaching system completely free of electrically or heat-conductive materials. Elimination of metallic hinge between individual temples 11 and 12 and the frame 10 eliminates any possibility of an electrical hazard. This is a particularly desirable feature in the present invention since, as above specified, the present spectacle is of particular advantage for use by welders who are continually faced with the problem of working with the safety glasses facing downwardly. This dielectric construction may preferably, in accordance with the present invention, be accommodated by providing an integral hinge as may be seen from the left-hand portion of FIGS. 2 and 3. As there shown, the temple 12 is provided with an integral flap 12a which may be secured by mechanical means such as a plastic rivet, or glued by means of an epoxy resin cement or similar material directly to the frame 10. By providing the reduced thickness 12b and the slot 12c an integral stop is formed at 22 which limits outward movement of the temples 11, 12. The device is entirely without metallic components and, at the same time, provides an inwardly foldable temple construction of extremely inexpensive manufacture.

It will be apparent to those skilled in the art from a consideration of the embodiments shown in FIGS. 1 through 3 that variations may be made in accordance with the principles of the present invention without departing from the novel and inventive concepts thereof. For example, the means for securing the resilient headband to the outermost ends of the temple may be modified in various ways to provide a pinch-type attachment. A further embodiment of this device is shown in FIGS. 4, 5 and 6. As there shown, the enlarged diameter portion 170 of the headband 180 is initially stretched to pass transversely into the slot 120 in the same manner as described relative to the passage of resilient portions 17 laterally through the slot 20. A reverse bend is applied to the band 180 and it is stretched in a rearward direction snapping into longitudinally extending, vertically opening, slot 121. In this arrangement, the portion 120 is pinched, or confined in a slot smaller than its free or relaxed dimensions, in two directions. It has been found that this double pinch construction provides, again, a system in which the resiliency of the smaller diameter portion of the band 180 provides for an initial stretching to cause loosening of the band with respect to the slots 120, 121 in the temple. It will be noted that no large ball-shaped portions, such as 17a, are provided with headband 180. A headband with such balls may, of course, be used with the devices of FIGS. 4, 5 and 6.

It will, of course, be apparent that still other variations may be made within the concepts of the present invention and it is my intent that the invention by limited solely by that of the hereinafter appended claims.

I claim as my invention:

1. A resilient headband for spectacles or the like comprising a length of resilient rubber-like material having its ends of a first diameter and its intermediate portion of a substantially reduced diameter whereby forces applied to the headband during its use result mainly in an elongation of the intermediate small diameter portion rather than the ends of the band.

2. The band structure set forth in claim 1 wherein each of the end portions of the band is provided with a plurality of larger diameter spaced integral projections for positive cooperation with retaining means.

3. The band structure of claim 1 wherein the end portions of the band have a diameter on the order of 0.060 inches.

4. The band structure of claim 1 wherein the material of the band has a durometer hardness of about 50.

5. The band structure of claim 4 wherein the said material is natural rubber.

6. The structure of claim 3 wherein the intermediate portion of the band has a diameter on the order of 0.050 inches.

* * * * *